(12) United States Patent
Bar-Ness et al.

(10) Patent No.: US 7,408,975 B2
(45) Date of Patent: Aug. 5, 2008

(54) TRANSMIT POWER ADAPTATION FOR CDMA COMMUNICATION SYSTEMS USING SUCCESSIVE INTERFERENCE CANCELLATION

(75) Inventors: Yeheskel Bar-Ness, Marlboro, NJ (US); Ye Hoon Lee, Suwon (KR)

(73) Assignee: New Jersey Institute of Technology, Newark, NJ (US)

( * ) Notice: Subject to any disclaimer, the term of this patent is extended or adjusted under 35 U.S.C. 154(b) by 255 days.

(21) Appl. No.: 11/076,751

(22) Filed: Mar. 10, 2005

(65) Prior Publication Data

US 2005/0207475 A1 Sep. 22, 2005

Related U.S. Application Data

(60) Provisional application No. 60/551,873, filed on Mar. 10, 2004.

(51) Int. Cl.
*H04B 1/00* (2006.01)
(52) U.S. Cl. ........................................ 375/141; 455/522
(58) Field of Classification Search .................. 375/141; 455/522

See application file for complete search history.

(56) References Cited

U.S. PATENT DOCUMENTS

| 6,463,296 | B1 * | 10/2002 | Esmailzadeh et al. | ........ | 455/522 |
| 2002/0142791 | A1 * | 10/2002 | Chen et al. | .................. | 455/522 |
| 2003/0157954 | A1 * | 8/2003 | Medvedev et al. | .......... | 455/522 |

OTHER PUBLICATIONS

Kim, "Combined power control and successive interference cancellation in DS/CDMA communications", Wireless Personal Multimedia Communications, 2002, the 5th International Symposium on vol. 3, Oct. 27-30, 2002 pp. 931-935 vol. 3.*

L. C. Yun and D. G. Messerschmitt, "Variable Quality of Service in CDMA Systems By Statistical Power Control", Proc. IEEE ICC, Jun. 1995, pp. 713-719.

S. Moshavi, "Multi-User Detection for DS-CDMA Communications", IEEE Communications Magazine, Oct. 1996, pp. 124-136.

(Continued)

*Primary Examiner*—Mohammed Ghayour
*Assistant Examiner*—Juan Alberto Torres
(74) *Attorney, Agent, or Firm*—Connolly Bove Lodge & Hutz LLP

(57) ABSTRACT

Transmit power adaptation for DS/CDMA systems is disclosed for a CDMA system that utilizes a successive interference cancellation receiver on fading channels. The transmission power is adapted in response to channel variations to achieve an arbitrary power profile for received signal powers at the system base station. That is, the received signal powers are distributed with some factor $x_i$'s given as:

$$S_R^i = S_R^{(1)} x_i, (i=2, 3, \ldots, K \text{ and } x_1 = 1)$$

where K is the number of users and $S_R^{(i)}$ is the received signal power of the user having the $i^{th}$ strength, and wherein user strengths are ranked in the order of estimated channel gains. The factor $x_i$ gives a measure of the disparity between the received power levels. The channel is estimated at both the transmitter and receiver. In one embodiment, the factors, $x_i$, for distributing the signal powers are selected such that the average BER for each user is minimized. In another embodiment, the factors, $x_i$, for distributing the signal powers are selected such that, after successive interference cancellation, an instantaneous BER for all users is equal.

7 Claims, 9 Drawing Sheets

OTHER PUBLICATIONS

W-M. Tam and F. C. M. Lau, "Analysis of Power Control and its Imperfections in CDMA Cellular Systems", IEEE Transactions on Vehicular Technology, vol. 48, No. 5, Sep. 1999, pp. 1706-1717.

S. W. Kim and Y. H. Lee, "Combined Rate and Power Adaptation in DS/CDMA Communications over Nakagami Fading Channels", IEEE Transactions on Communications, vol. 48, No. 1, Jan. 2000, pp. 162-168.

S. Verdu, "Wireless Bandwidth in the Making", IEEE Communications Magazine, Jul. 2000, pp. 53-58.

D-S. Yoo, W. E. Stark, "Interference Cancellation for Multirate Multiuser Systems", Proc. of VTC, 2001, pp. 1584-1588.

R. M. Buehrer, "Equal BER Performance in Linear Successive Interference Cancellation for CDMA Systems", IEEE Transactions on Communications, vol. 49, No. 7, Jul. 2001, pp. 1250-1258.

R. H. Mahadevappa, "Interference Cancellation Techniques for Multiuser Communication Systems" dissertation presented at Northeastern University, Boston, MA, Nov. 2002.

F. Berggren and S. B. Slimane, "Linear Successive Interference Cancellation in DS-CDMA Systems", Wiley J. of Wireless Communications and Mobile Computing, vol. 3, No. 7, 2003.

F. Berggren and S. B. Slimane, "Successive Interference Cancellation in Multi-Rate DS-CDMA Systems", Proc. PIMRC2003, vol. 2, Sep. 2003, pp. 1752-1756.

W. Li and T. A. Gulliver, "Successive Interference Cancellation for DS-CDMA Systems with Transmit Diversity", EURASIP Journal on Wireless Communications and Networking 2004, pp. 46-54.

* cited by examiner

TRANSMIT POWER ADAPTATION FOR CDMA COMMUNICATION SYSTEMS USING SUCCESSIVE INTERFERENCE CANCELLATION

CROSS-REFERENCE TO RELATED APPLICATIONS

This application claims the benefit of priority from U.S. Provisional Patent Application Ser. No. 60/551,873 filed on Mar. 10, 2004. The above provisional patent application is incorporated by reference herein in its entirety.

GOVERNMENT RIGHTS

The United States government may have certain rights in this invention. A portion of the work described herein was supported in part by the National Science Foundation under NSF Grant CCR-0085846.

BACKGROUND OF THE INVENTION

1. Field of the Invention

This invention relates to a method and apparatus for wireless communications and, more particularly, to adaptive power control for CDMA communication systems using successive interference cancellation.

2. Description of the Related Art

Radio links for either a portable or vehicular unit can be characterized by time-varying multipath fading, which causes the link quality to vary with time. When the transmitter and receiver are provided with channel state information (CSI), transmission schemes can be adapted to this information, enabling more efficient use of the channel. For example, in current code-division multiple-access (CDMA) cellular systems (IS-95), transmission power is adapted to maintain received power from all mobiles at the same desired level. This conventional technique of controlling the signal strength at the base station (base station) is well known to be optimal for the matched filter receiver.

In recent years, there has been much interest in improving the capacity of direct-sequence CDMA (DS/CDMA) systems through the use of multi-user detectors. Successive interference cancellation (successive interference cancellation) is a form of multi-user detection in which the strongest signal is the first detected and cancelled, while the weakest is the last detected. Although the matched-filter receiver attains its best performance under equal received power from all users, the successive interference cancellation receiver favors unequal received signal powers. Studies have been conducted for finding the received signal strengths that give, after successive cancellation, equal bit-error rate (BER) performance for all users. See, for example, R.M. Buehrer, "Equal BER performance in linear successive interference cancellation for CDMA systems," IEEE Trans. On Communications, Vol. 49, pp. 1250-1258 (July 2001) and G. Mazzini, "Equal BER with successive interference cancellation DS-CDMA systems on AWGN and Rician channels," Proc. IEEE PIMRC, pp. 727-731 (September 1995). It has been shown that, by ignoring error propagation, a geometric distribution of received powers will provide an equal BER performance for all users. See, for example, A.J. Viterbi, "Very low rate convolutional codes for maximum theoretical performance of spread-spectrum multiple access channels, " IEEE J. on Selected Areas in Communications, Vol. 8, pp. 641-649 (May 1990). A geometric distribution of received powers that minimizes the average BER, averaged over all active users, has also been considered. See, for example, J. H. Kim et al., "Combined power control and successive interference cancellation in DS/CDMA communications, " Proc. IEEE PIMRC, pp. 931-935 (October 2002).

In spite of the years of research in the area, power adaptation techniques in CDMA systems using successive interference cancellation have predominantly been limited in their approaches to using geometric distributions of received powers to achieve a desired BER performance result.

SUMMARY OF THE INVENTION

Unlike the prior art that focused on a geometric power profile, the present invention introduces power adaptation for DS/CDMA systems that employ a successive interference cancellation receiver for use in fading channels. The transmission power is adapted in response to channel variations to achieve an arbitrary power profile for received signal powers at the system base station. That is, the received signal powers are distributed with some factor $x_i$'s given as:

$$S_R^{(i)} = S_R^{(1)} x_i, (i=2, 3, \ldots, K \text{ and } x_1=1)$$

where K is the number of users and $S_R^{(i)}$ is the received signal power of the user having the $i^{th}$ strength, and wherein user strengths are ranked in the order of estimated channel gains. The factor $x_i$ gives a measure of the disparity between the received power levels. The channel is estimated at both the transmitter and receiver.

In one embodiment of the invention, the factors, $x_i$, for distributing the signal powers are selected such that the average BER for each user is minimized. In another embodiment of the invention, the factors, $x_i$, for distributing the signal powers are selected such that, after successive interference cancellation, an instantaneous BER for all users is equal.

BRIEF DESCRIPTION OF THE DRAWINGS

A more complete understanding of the invention may be obtained by reading the following description of specific illustrative embodiments of the invention in conjunction with the appended drawings in which.

Figure 1:
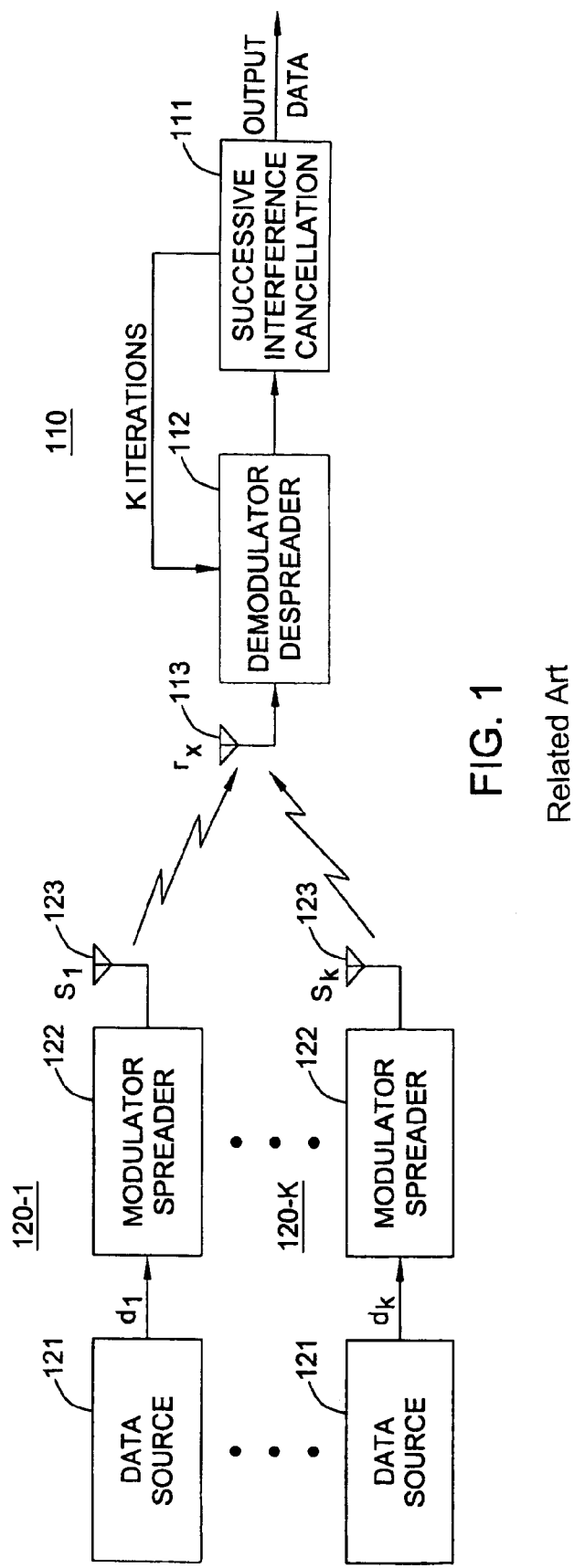
FIG. 1 shows a simplified schematic block diagram of an exemplary up-link wireless CDMA communication system.

It should be noted that the appended drawings illustrate only typical embodiments of this invention and are therefore not to be construed as limiting of its scope, for the invention may admit to other equally effective embodiments. Where possible, identical reference numerals have been inserted in the figures to denote identical elements.

DETAILED DESCRIPTION

In the description that follows, certain terms are used interchangeably. The term "user" may be interchanged with the terms "mobile", "mobile station", and "mobile user". The term "base station" is also used interchangeably with the terms "base" and "cell site." These usages are not intended to be limiting in any way.

In the description that follows, power adaptation is disclosed for CDMA systems employing a successive interference cancellation receiver. The exemplary CDMA system discussed below is a DS/CDMA system. It is understood that the wireless channel exhibits fading and, in the analysis of the system performance, it is assumed for ease of analysis that the fading is Nakagami-fading.

In contrast with the prior art systems that are based upon a geometric power profile in their power adaptation, the transmission power is adapted in accordance with the principles of the present invention relative to channel variations in order to make the received powers at base station exhibit an arbitrary power profile. That is, the received signal powers are distributed with some factor $x_i$'s selected according to the following rule:

$$S_R^i = S_R^{(1)} x_i (i=2, 3, \ldots, K \text{ and } x_1=1) \quad (1)$$

where K is the number of users and $S_R^{(i)}$ is the received power of the user having the $i^{th}$ signal strength, when user signal strengths are ranked in the order of estimated channel gains. Separate channel estimates are used for users' strength ranking as opposed to the correlation of the received signal with each user's spreading sequence. It is contemplated that this approach is better suited for next-generation mobile cellular systems, as separate channel estimation with transmitted pilot symbols is performed in both wide-band CDMA (WCDMA) and cdma2000 standards. Channel estimation is assumed to be performed at least at the receiver.

The factor $x_i$ in Equation (1) gives a measure of the disparity between the constituent signal power levels in the received signal. In one embodiment of the present invention described in more detail below, the factors $x_i$ are selected so that the average BER for each user is minimized and a fixed average transmission power constraint on the system is maintained. In another embodiment of the present invention described in more detail below, the factors $x_i$ are selected so that, after successive interference cancellation, an equal BER is obtained independent of channel variations for all received signals. It will be shown below that each power adaptation technique has a significant performance gain over the conventional equal received power adaptation method.

This description is organized as follows: the system model is introduced and the signal-to-interference-plus-noise ratio (SINR) of the received signals is formulated for a successive interference cancellation receiver; the power-adaptation techniques in accordance with the principles of the present invention are described and the resulting BER performances for these techniques are analyzed; numerical results from the prior analyses are presented and the performance improvements provided by power adaptation techniques over the conventional method are then described.

An exemplary DS/CDMA communication system is used for the description below with binary phase-shift-keying (BPSK) signaling. It is assumed that the channel variation due to fading is slow relative to the bit duration and that the channel fading is characterized by the Nakagami probability density function (pdf). The Nakagami fading model fits experimental data from a variety of fading environments, including urban and indoor multipath propagation. For ease of understanding, a single-cell system is presented although the result herein is applicable to multi-cell systems. The implications of a multiple-cell system can be analyzed and accounted for by simply adding an out-of-cell interference coefficient.

FIG. 1 shows a simplified block diagram of an exemplary uplink DS/CDMA wireless system known in the art. The CDMA system includes a plurality of K mobile stations 120 (stations 120-1 through 120-K) in wireless communication with a base station 110. Each mobile station includes a data source 121 that outputs a data (information) sequence, $d_i$, for $i=1, \ldots K$. Each data sequence is supplied to a modulator and spreader 122 that performs data modulation and pseudo-noise sequence spreading of the data sequence by well known direct sequence (DS) code division multiple access (CDMA) techniques to produce the transmit signal with power $S_i$. Each transmit signal is applied to antenna 123 for broadcast to the base station over the wireless channel. Antenna 113 at base station 110 receives a signal $r_x$, that is supplied to demodulator and despreader 112. The demodulator cooperates with the successive interference cancellation arrangement 111, which utilizes the conventional successive interference cancellation technique known in the art, to decode the strongest signal from the received signal, to cancel its effect from the received signal after regeneration, and to iterate the process through K iterations until the weakest signal is decoded. In essence, successive interference cancellation successively subtracts off the decoded signal from the composite received signal $r_x$. The decoded signals are output from arrangement 111.

In the theoretical analysis that follows, it is assumed that the channel is frequency nonselective. This assumption is valid for channels with a small delay spread, such as indoor systems. Accordingly, the received signal r(t) at the base station can be expressed as:

$$r(t) = \sum_{k=1}^{K} \sqrt{2 G_k S_k}\, b_k(t - \tau_k) a_k(t - \tau_k) \cos(2\pi f_c t + \phi_k) + n(t) \quad (2)$$

where $S_k$ is the transmission power of user k, $b_k(\cdot)$ is the random binary data sequence at a rate of 1/T and $a_k(\cdot)$ is the random signature sequence at a rate of $1/T_c$ for user k. $\tau_k$ is the channel-induced delay and $\phi_k$ is the channel-induced phase, each for a user k. These variables are assumed to be independent and uniformly distributed, the former over a bit interval and the latter over [0, 2π]. n(t) represents white Gaussian noise with mean zero and two-sided power spectral density $N_0/2$. $G_k$ is the gamma random variable representing the channel power gain for a user k with its probability density function is given by:

$$P_{G_k}(g) = \left(\frac{m}{\Omega_0}\right)^m \frac{g^{m-1}}{\Gamma(m)} e^{-mg/\Omega_0} \quad (3)$$

where m is the Nakagami fading parameter $$\Omega_0 = E|G_k| \quad (4)$$

and Γ(m) is the gamma function defined as $$\Gamma(m) \triangleq \int_0^\infty t^{m-1} e^{-t} dt, m > 0. \tag{5}$$

It is further assumed that the spreading sequences and CSI of all the users are known or detectable at the receiver. Received signals are ranked in the order of channel gains. The basic process employed by a successive interference cancellation receiver is to decode the strongest signal (i.e., the signal having the highest channel gain) and then to cancel its effect from the composite received signal after regeneration. Any remaining constituent signals from the other users are cancelled in the decreasing order of channel gains.

Figure 3:
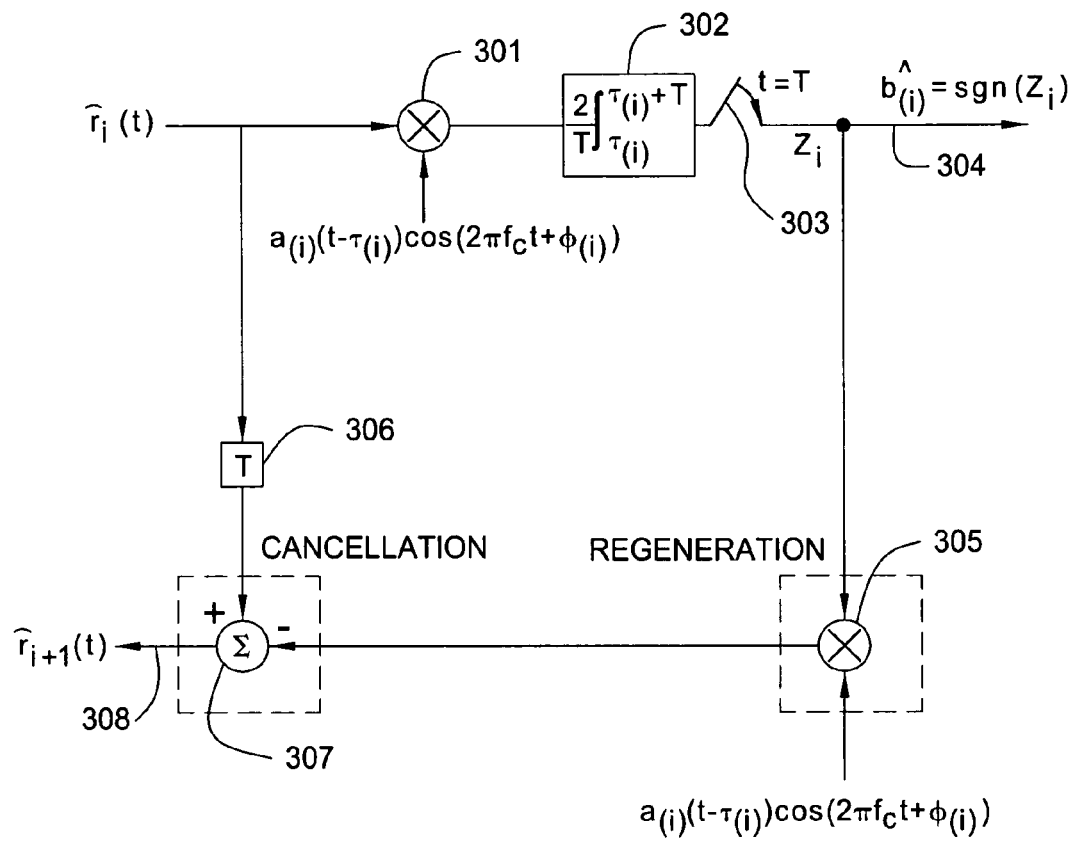
FIG. 3 shows a block diagram of an exemplary successive interference cancellation arrangement utilized in the system of FIGS. 1 and 2.

FIG. 3 shows a simplified block diagram of the $i^{th}$ cancellation stage of the successive interference cancellation receiver. This block diagram is replicated (its process is repeated) until the last decision is completed for the weakest constituent signal (i.e., the user signal having the lowest channel gain). At the $i^{th}$ cancellation stage, a coherent correlator is realized by mixer 301 and integrator 302 with periodic switch 303. The correlator recovers the user signal of the $i^{th}$ strongest signal and forms a decision statistic $Z_i$ as follows:

$$Z_i = \frac{2}{T} \int_{\tau_{(i)}}^{\tau_{(i)}+T} \hat{r}_i(t) a_{(i)}(t - \tau_{(i)}) \cos(2\pi f_c t + \phi_{(i)}) dt \tag{6}$$
$$= \sqrt{2 G_{(i)} S_{(i)}} b_{(i)} + I_i$$

where $$I_i = \sum_{k=i+1}^{K} \sqrt{2 G_{(k)} S_{(k)}} C_{k,i} + \eta_i - \sum_{k=1}^{i-1} I_k C_{k,i}. \tag{7}$$

$\{G_{(k)}\}$ is the ordered set of the channel power gain $\{G_k\}$ for the k users, so that $G_{(1)} \geq G_{(2)} \geq G_{(3)} \geq \ldots \geq G_{(k)} \geq \ldots \geq G_{(K)}$. $S_{(k)}$ is the transmission power of the signal having the $k_{th}$ signal strength (the $k_{th}$ strongest signal) and $b_{(k)}$ output on lead 304 is the data bit of the signal having the $k^{th}$ signal strength (the $k^{th}$ strongest signal) represented as $\text{sgn}(Z_i)$. $C_{k,j}$ is the cross-correlation between the $k^{th}$ strongest signal and the $j^{th}$ strongest one, given by the following relationship:

$$C_{k,j} = \frac{\cos(\phi_{(k)} - \phi_{(j)})}{T} \int_{\tau_{(j)}}^{\tau_{(j)}+T} a_{(k)}(t - \tau_{(k)}) a_{(j)}(t - \tau_{(j)}) b_{(k)}(t - \tau_{(k)}) dt. \tag{8}$$

In Equation (7), the first term is the multiple-access interference (MAI) caused by uncancelled user signals; the second term is the Gaussian noise with mean zero and variance $N_0/T$; and the third term is the cumulative contribution due to imperfect cancellations of each one of the k user signals, k=1, 2, ..., i−1.

The successive interference cancellation arrangement in FIG. 3 further includes a mixer 305 that is used to regenerate the $i^{th}$ strength signal. Once regenerated, the $i^{th}$ strength signal is supplied to summing junction 307 for subtraction and, therefore, cancellation from the delayed (via T unit delay 306) remaining composite received signal $\hat{r}_i(t)$ in order to produce the new remaining composite received signal $\hat{r}_{i+1}(t)$, shown at reference numeral 308. As stated above, this correlation, regeneration, and cancellation process is iterated until the weakest signal is recovered from the received signal.

It can be shown that $\text{Var}[C_{k,i}] = T_c/3T$. The variance $\sigma_i$ of $I_i$ can be formulated as:

$$\sigma_i = \left( \frac{N_0}{T} + \frac{2}{3N} \sum_{k=2}^{K} E[G_{(k)} S_{(k)}] \right) \left( 1 + \frac{1}{3N} \right)^{i-1} - \tag{9}$$
$$\frac{2}{3N} \sum_{k=2}^{i} E[G_{(k)} S_{(k)}] \left( 1 + \frac{1}{3N} \right)^{i-k}$$

where N is the spreading gain defined as:

$$N \triangleq \frac{T}{T_c}. \tag{10}$$

It is assumed for this analysis that, in Equation (7), the first and third terms and $I_k$ and $C_{k,i}$, are independent. From Equations (6) and (9), as a function of the channel-fading realization, the instantaneous signal-to-interference-plus-noise ratio (SINR) for the $i^{th}$ strongest signal is given by:

$$\Lambda_i = \left[ \left( \frac{N_0}{2 G_{(i)} S_{(i)} T} + \frac{1}{3N} \sum_{k=2}^{K} \frac{E[G_{(k)} S_{(k)}]}{G_{(i)} S_{(i)}} \right) \left( 1 + \frac{1}{3N} \right)^{i-1} - \frac{1}{3N} \sum_{k=2}^{i} \frac{E[G_{(k)} S_{(k)}]}{G_{(i)} S_{(i)}} \left( 1 + \frac{1}{3N} \right)^{i-k} \right]^{-1}. \tag{11}$$

Transmit power adaptation as described herein in accordance with the principles of the present invention ensures that the received power of the $i^{th}$ strongest user signal be kept at a given level, $S_R^{(i)}$. That is, the transmission power $S_{(i)}$ of the user having the $i^{th}$ strongest channel gain is adjusted to compensate for fading such that $G_{(i)} S_{(i)}$ is equal to $S_R^{(i)}$. Since the channel gain $G_k$ for user can be any of the $i^{th}$ strongest gains, the probability of $G_k$ being the $i^{th}$ strongest among all users is equally probable (i.e., 1/K) for all i, k $\in \{1, 2, \ldots, K\}$. Therefore, the average transmission power $S_T$ for user k is given by:

$$S_T \triangleq E[S_k] = \frac{1}{K} \sum_{i=1}^{K} E[S_{(i)}] = \frac{1}{K} \sum_{i=1}^{K} E\left[ \frac{S_R^{(i)}}{G_{(i)}} \right]. \tag{12}$$

It follows from Equation (1) that the received power level $S^{R(i)}$ of the $i^{th}$ strongest user signal can be expressed as:

$$S_R^{(i)} = G_{(i)} S_{(i)} = S_R^{(1)} x_i, i=1, 2, \ldots, K. \tag{13}$$

Then, Equation (12) can be rewritten by $$S_T = \frac{S_R^{(1)}}{K} \sum_{i=1}^{K} x_i \varepsilon(i_t - 1) \tag{14}$$

where,

-continued $$\varepsilon(i, n) \stackrel{\Delta}{=} E[G_{(i)}^n] = \int_0^\infty g^n P_{G_{(i)}}(g) dg. \quad (15)$$

Using order statistics, the probability density function of $G_{(i)}$ is related to the distribution of $G_k$ as:

$$P_{G_{(i)}}(g) = \frac{K!}{(K-i)!(i-1)!}[F_{G_k}(g)]^{K-i}[1-F_{G_k}(g)]^{i-1}P_{G_k}(g) \quad (16)$$

where $F_{G_k}(g)$ is the cumulative distribution function (cdf) of $G_k$, given by:

$$F_{G_k}(g)\int_0^g P_{G_k}(x) dx = 1 - \frac{\Gamma\left(m, \frac{mg}{\Omega_0}\right)}{\Gamma(m)} \quad (17)$$

where $\Gamma(a,z)$ is the incomplete gamma function defined as:

$$\Gamma(a, z) \stackrel{\Delta}{=} \int_z^\infty t^{a-1} e^{-t} dt. \quad (18)$$

Substituting Equation (14) into Equation (13) yields $$S_R^{(i)} = \frac{KS_T x_i}{\sum_{k=1}^K x_k \varepsilon(k, -1)}. \quad (19)$$

From Equation (11), $G_{(k)}S_{(k)}$ is adjusted to equal a given $S_R^{(i)}$, that is, $E[G_{(k)}S_{(k)}]/G_{(i)}S_{(i)} = S_R^{(k)}/S_R^{(i)}$. With Equation (13), this equals $x_k/x_i$. Hence, together with Equation (19), for the present power adaptation that ensures the received power of the $i^{th}$ strongest to be at a given level $S_R^{(i)}$, the instantaneous signal-to-interference-plus-noise ratio for the $i^{th}$ strongest signal is then determined as:

$$\Lambda_i = \left[\left(\frac{N_0}{2KS_T T}\sum_{k=1}^K \varepsilon(k, -1)\frac{x_k}{x_i} + \frac{1}{3N}\sum_{k=2}^K \frac{x_k}{x_i}\right)\left(1 + \frac{1}{3N}\right)^{i-1} - \frac{1}{3N}\sum_{k=2}^i \frac{x_k}{x_i}\left(1 + \frac{1}{3N}\right)^{i-k}\right]^{-1}. \quad (20)$$

A Gaussian approximation is used to calculate the BER where it is assumed commonly for successive interference cancellation receivers that the interference plus noise $I_t$ is Gaussian with mean zero and variance $\sigma_i$. Then, the conditional error probability, given that the user k's channel gain is the $i^{th}$ strongest, is given by $Q(\sqrt{\Lambda_i})$. Therefore, the average (over the channel statistics) BER for every user is given by:

$$\overline{P}_b = \frac{1}{K}\sum_{i=1}^K Q(\sqrt{\Lambda_i}). \quad (21)$$

It should be noted that the average BER for the conventional power adaptation can be obtained by substituting Equation (20) with $x_i=1$, $i=1, 2, \ldots, K$ into Equation (21).

Figure 2:
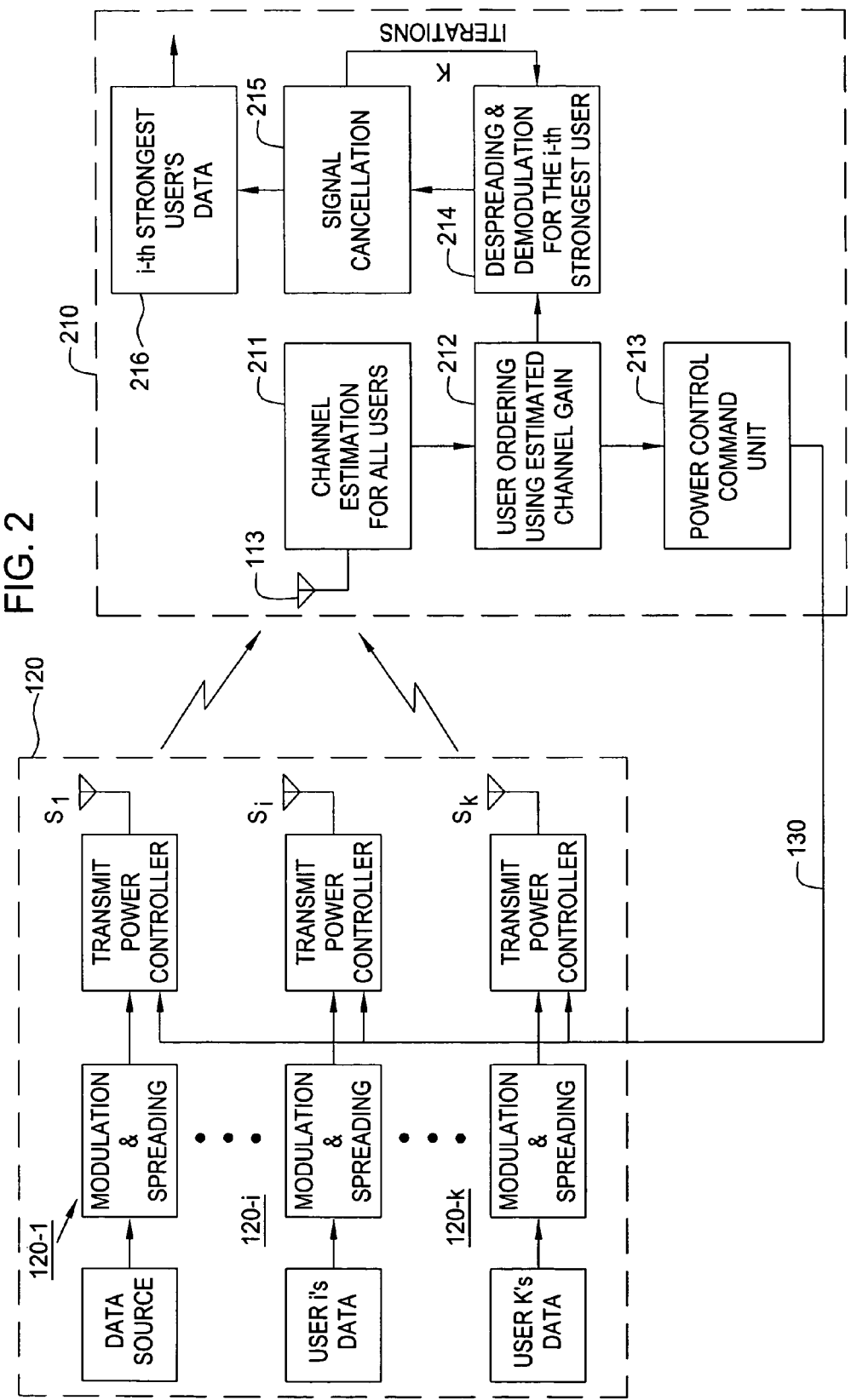
FIG. 2 shows a more detailed block diagram of the system in FIG. 1 modified in accordance with the principles of the present invention.

FIG. 2 shows a more detailed block diagram of a system realized in accordance with the principles of the present invention. The system includes the plurality of users 120 communication via DS/CDMA wireless techniques with the receiver 210. Signals from the users are received via antenna 113. Element 211 estimates the channel gain for each user signal. As stated before, channel estimation is conducted by using each user's transmitted pilot symbols, which is a commonly employed method in the WCDMA and cdma2000 standards. Furthermore, channel estimation is assumed to be performed at the receiver. Element 212 places the users in order in accordance with their respective estimated channel gain from element 211. The ordering and the related channel gain information is then output by element 212 to element 213. The estimated and ordered channel gain information is output to demodulator and despreader 214. The successive interference cancellation portion of the receiver is formed by elements 214 and 215. In elements 214 and 215, the $i^{th}$ strongest signal is recovered by demodulation and dispreading and then it is cancelled from the composite received signal to form a reduced composite received signal that is fed back via the iteration loop for subsequent demodulation, dispreading and cancellation according to the ordering determined by element 212. When the $i^{th}$ strongest user's data is recovered, it is output from element 216. Power command control unit 213 uses the ordering information based on estimated channel gains for the users to perform a calculation of the transmit power in accordance with the method shown in FIG. 4. As shown in FIG. 2, feedback channel 130 is depicted between the base station and the mobile user stations for carrying the adapted transmit power information back to the associated mobile user stations. While feedback channel is shown as a solid line in the figure, it is understood that this depiction was done for ease of understanding. The feedback channel can be realized as a real or logical or virtual wireless channel received by each of the mobile station antennas. The adapted power level received by the related mobile station on its respective antenna is processed and applied to the user's associated transmit power controller in transmitter 120, wherein the transmit power is adjusted to the level indicated in the adapted transmit power level for that user.

As stated previously, the feedback channel can be a real channel such as a dedicated signalling or control channel allocated within the communication protocol. Alternatively, the feedback channel can be realized as a logical or virtual channel by using, for example, an overhead portion or a payload portion of X symbols in the user data transmission sequence for transmitting the adapted transmit power levels. This portion of the sequence could be recovered by the transmitter and applied to the corresponding transmit power controller. It is contemplated that the feedback signal would include the sequence of adapted transmit power levels together with an indicator or index associating each level with its particular mobile user station.

Figure 4:
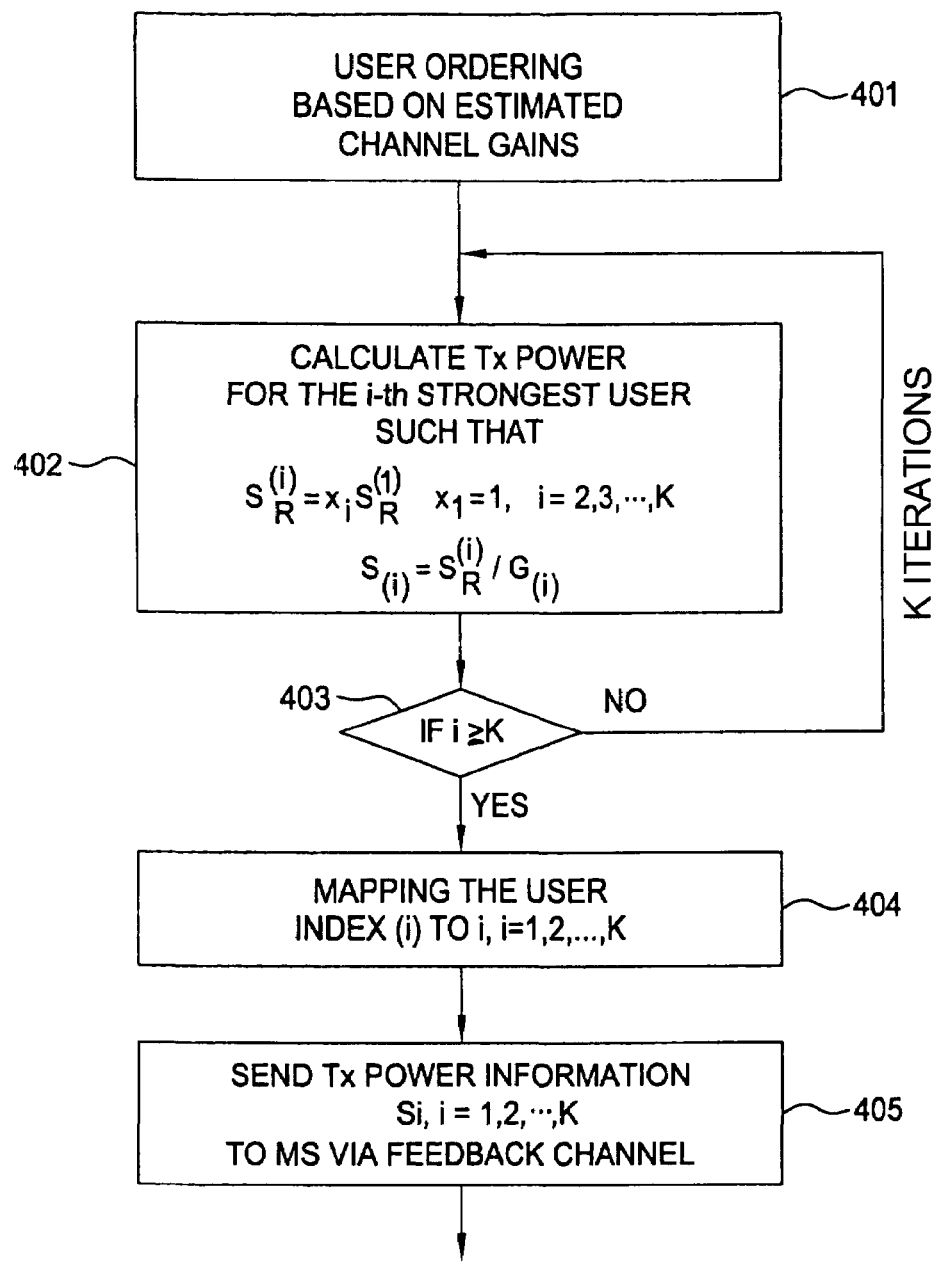
FIG. 4 shows a flowchart of a method for adapting the transmit power in accordance with the principles of the present invention.

The method shown in the flowchart of FIG. 4 is employed in accordance with the principles of the present invention to calculate the transmit signal powers according to Equation (1) using one of the two power assignment methodologies described in more detail below. One methodology for determining the power profile is termed the minimal average bit error rate (BER) power adaptation methodology and the other methodology for determining the power profile is termed the equal BER power adaptation methodology.

In FIG. 4, step 401 determines the user ordering based on the estimated channel gains. That is, the channel gains as estimated are ordered as the set $\{G_{(k)}\}$ where the subscript runs from 1 to K and each element in the set is greater than or equal to the next element in the set. A user identifier is associated with each channel gain in the set.

Steps 402 and 403 form an iterative process in which the transmit power for each user is adapted from the $i^{th}$ strongest signal strength user to the weakest signal strength user according to the methodologies described above using the relationship from Equation (1) where the received signal powers are:

$$S_R^i = S_R^{(1)} x_i, \ (i=2, 3, \ldots, K \text{ and } x_1 = 1), \quad (1)$$

for K being the number of users, $S_{(i)} = S_R^{(i)}/G_{(i)}$ is the transmit signal power of the signal from the $i^{th}$ strongest mobile station, and $S_R^{(i)}$ is the received signal power of the user having the $i^{th}$ strength, and wherein the user signal strengths are ranked in the order of estimated channel gains $G_{(i)}$. The index (i) refers to the ordering or ranking performed with respect channel gain. It should be understood that mobile station j, where $j=1, 2, \ldots, K$, may actually be associated with index (i) because it corresponds to the $i^{th}$ highest channel gain. As stated above, the factors, $x_i$, give a measure of the disparity between the received power levels. Step 403 insures that the adaptation continues until all K users have had their power adapted by testing whether the variable, i, is less than K.

In step 404, the adapted transmit power levels $S_{(i)}$ are associated with their respective user identifier, j, by mapping each indexed transmit power level $S_{(i)}$ to corresponding mobile station j that exhibits the index (i) in the ordering of channel gains. In step, 405, the adapted transmit power level information including the adapted power level and the associated mobile user identification is transmitted back to the users via the feedback channel 130. For example, it is contemplated that the feedback can occur by sending pairs of information including $(S_{(i)}, j)$ where $S_{(i)}$ is the adapted transmit power and j is the identifier of the mobile station for which the adapted power $S_{(i)}$ was calculated.

One embodiment of the present invention uses the adaptation methodology called minimal BER power adaptation in which the best transmission power assignment is determined for minimizing the average BER in Equation (21). This minimization problem can be formulated as $$\underset{\substack{x_2, x_3, \ldots, x_K \\ x_1 = 1}}{\text{minimize}} \ \overline{P}_b = \frac{1}{K} \sum_{i=1}^{K} Q(\sqrt{\Lambda_i}). \quad (22)$$

where $\overline{P}_b$ is the average probability of a bit error. Clearly, the minimization in Equation (22) is over K−1 unknown received power factors $x_i$, $i=2, 3, \ldots, K$, which are constrained to be positive. To determine the optimal value of $x_i$, the partial derivatives of $\overline{P}_b$ are taken with respect to $x_i$ as follows $$\frac{\partial \overline{P}_b}{\partial x_i} = \frac{1}{K} \sum_{i=1}^{K} \frac{\partial Q(\sqrt{\Lambda_k})}{\partial \Lambda_k} \cdot \frac{\partial \Lambda_k}{\partial x_i} \quad (23)$$

$$= \frac{1}{\sqrt{8\pi} K} \sum_{k=1}^{K} e^{-\Lambda_k/2} \Lambda_k^{3/2} \Xi_{k,1}$$

where $$\Xi_{k,1} \equiv \frac{\partial(1/\Lambda_k)}{\partial x_i}.$$

A set of necessary conditions for an optimal received power profile that minimizes the average BER can be obtained by setting Equation (23) to zero for $i=2, 3, \ldots, K$. A multidimensional Newton method has been used in experimental practice to find optimal $x_i$'s above. There is no one generally accepted method for solving the above system of more than one nonlinear equation. A multidimensional Newton method and a multidimensional Secant method are frequently employed numerical techniques for such a root finding problem. As stated above, the multidimensional Newton method is used herein to find optimal $x_i$'s. The multidimensional Newton method requires an evaluation of both the Equation (23) and the derivative of the Equation (23) at an arbitrary point in K−1 dimensional space. This method gives a very efficient means of converging to the solution, provided that a sufficiently good initial guess. The values of $x_i$ are related to the amount by which the transmit power levels should be varied at each mobile station transmitter. Equation (1) indicates that the desired received power for the i-th strongest user can be determined by using the values of $x_i$. Then, the required transmit power for this user is calculated as $S_{(i)} = S_R^{(i)}/G_{(i)}$, which is transmitted back to the corresponding mobile station subsequent to the user index mapping process.

Another embodiment of the present invention uses the adaptation methodology called equal BER power adaptation in which the best transmission power assignment is determined for maintaining the link (user channel) quality as a fixed value regardless of channel variations. This corresponds to making the signal-to-interference-plus-noise ratio at each cancellation stage of the successive interference cancellation receiver the same value for all received signals. That is expressed as follows:

$$\Lambda_1 = \Lambda_2 = \ldots = \Lambda_K = \gamma_o \quad (24)$$

where $\gamma_o$ is the desired fixed signal-to-interference-plus-noise ratio. The received power levels are then geometrically distributed in order to obtain equal signal-to-interference-plus-noise ratio for all signals after successive interference cancellation. That is, for equal signal-to-interference-plus-noise ratio (SINR), $x_i$ in Equation (13) can be given by $$x_i = r^{i-1}, \ i=1, 2, \ldots, K \quad (25)$$

and corresponding instantaneous signal-to-interference-plus-noise ratio is $$\Lambda_i = \left[\left(\frac{N_0}{2KS_TT}\sum_{k=1}^{K}r^{k-i}\varepsilon(k,-1)+\frac{1}{3N}\sum_{k=2}^{K}r^{k-i}\right)\left(1+\frac{1}{3N}\right)^{i-1} - \frac{1}{3N}\sum_{k=2}^{i}r^{k-i}\left(1+\frac{1}{3N}\right)^{i-k}\right]^{-1}. \quad (26)$$

The power ratio r required to obtain the same signal-to-interference-plus-noise ratio for all received signals is then given by:

$$r = \frac{3N+1}{3N+\gamma_o}. \quad (27)$$

Thus, the power-adaptation strategy that employs the geometric power profile with r provides equal BER power adaptation for the users. Getting the value of r (i.e., $x_i$ for i=1, 2, . . . , K) ensures the ability to calculate the transmit power $S_{(i)}$ for the $i^{th}$ strongest user. Then, with the aid of the user index mapper 404, the corresponding transmit power level $S_j$, j=1, 2, . . . , K, is transmitted back to each associated mobile user station via the feedback channel 130 so that the transmitters can each adapt their respective transmit power levels. The $\gamma_o$ (or r) are obtained by substituting Equation (27) in Equation (26) together with Equation (24) and solving with a numerical technique such as the secant method or the Newton approximation method. In one example from experimental practice, the secant method is used to find $\gamma_o$ (or r). In this calculation, any of $\Lambda_i$, i ∈{1, 2, . . . , K} in Equation (24) can be used because all $\Lambda_i$'s yield the same value of $\gamma_o$ or r. Since the equal BER power adaptation ensures the same signal-to-interference-plus-noise ratio for all received signals, the average BER is given by:

$$\overline{P}_b = Q(\sqrt{\gamma_o}) \quad (28)$$

For the purpose of performance comparison, the successive interference cancellation scheme is considered without power adaptation. When channel state information (CSI) is not available at the transmitter, the transmission power is fixed at $S_T$ (i.e., $S_{(k)}=S_{(i)}=S_T$ for every k and i). In this case, the following relationship occurs:

$$\frac{E[G_{(k)}S_{(k)}]}{G_{(i)}S_{(i)}} = \frac{E[G_{(k)}]}{G_{(i)}} = \frac{\varepsilon(k,1)}{G_{(i)}} \quad (29)$$

where the definition in Equation (15) is used. Substituting Equation (29) in Equation (11), the instantaneous signal-to-interference-plus-noise ratio of the $i^{th}$ strongest signal with such a non-adaptive scheme is given as:

$$\Lambda_i = v_i G_{(i)} \text{ where} \quad (30)$$

$$v_i \triangleq \left[\left(\frac{N_0}{2S_TT}+\frac{1}{3N}\sum_{k=2}^{K}\varepsilon(k,1)\right)\left(1+\frac{1}{3N}\right)^{i-1} - \frac{1}{3N}\sum_{k=2}^{i}\varepsilon(k,1)\left(1+\frac{1}{3N}\right)^{i-k}\right]^{-1} \quad (31)$$

Since $\Lambda_i$ in Equation (30) is a function of $G_{(i)}$, which fluctuates with channel variations, the conditional BER expression is then given by $$\mathop{E}_{G_i}\left[Q\sqrt{v_i G_i}\right],$$

given that the user k's channel gain is the $i^{th}$ strongest signal level. Thus, the average BER for user k is given by:

$$\overline{P}_b = \frac{1}{K}\sum_{i=1}^{K}\int_0^{\infty}Q(\sqrt{v_i g})P_{G_{(i)}}(g)dg. \quad (32)$$

Figure 5:
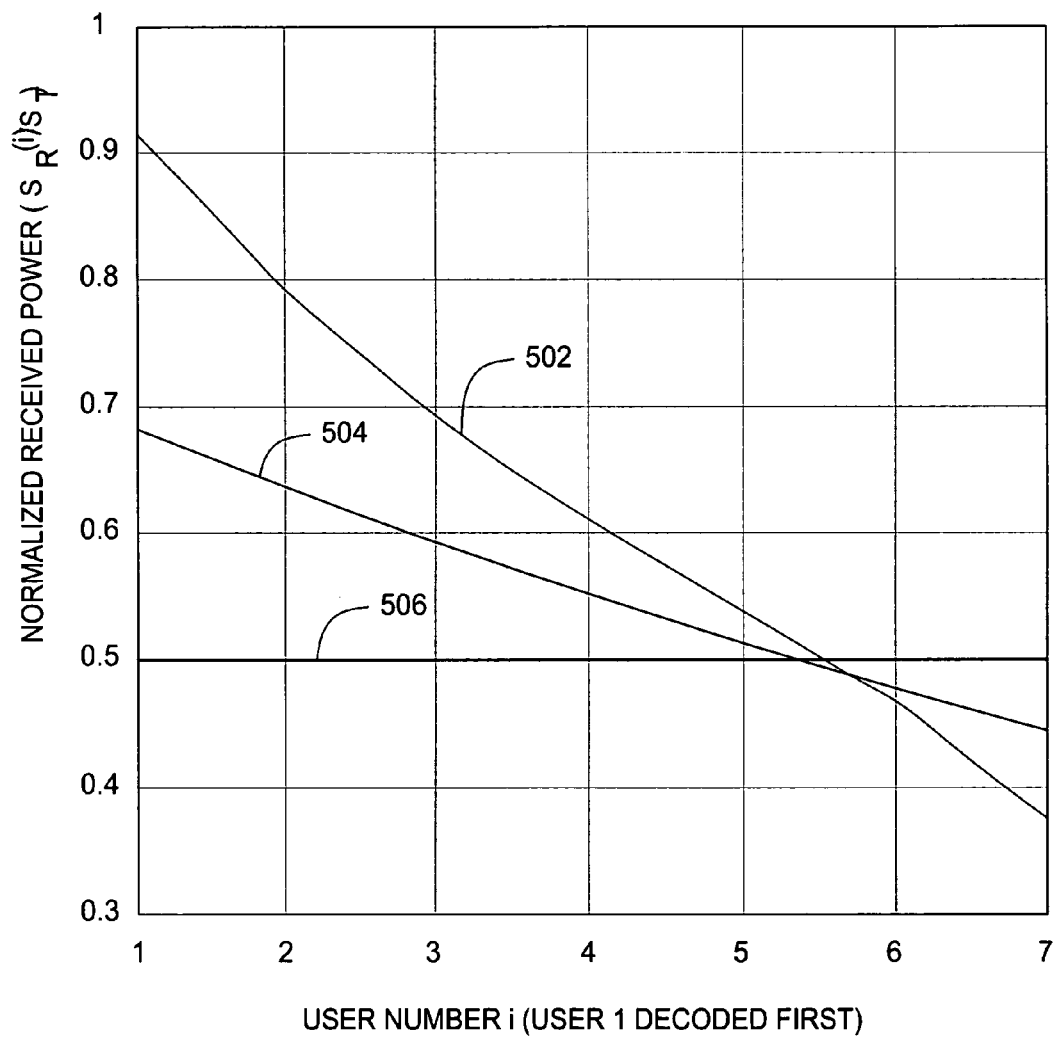
FIG. 5 shows a plot of the received power distribution for successive interference cancellation versus the user number i.

FIG. 5 shows a received power distribution for several adaptation schemes. In this figure, the variables have the following values: number of users K=7, the spreading gain N=32, the Nakagami fading parameter m=2, $S_T T/N_0$=10 dB, and $\Omega_0$=1. Curve 502 corresponds to the minimal BER power adaptation technique; curve 504 corresponds to the equal BER power adaptation technique; and curve 506 corresponds to the conventional equal power adaptation. It is to be noted that, with the minimal and the equal BER power-adaptation schemes, received power levels decrease for users in order of their cancellation. It is also noted that, between the earlier and later cancelled signals, the power difference with minimal BER power adaptation is greater than that of equal BER power adaptation. This indicates that, in order to minimize the average BER, higher received power is required to achieve reliable symbol decision at earlier cancellation stages.

Figure 6:
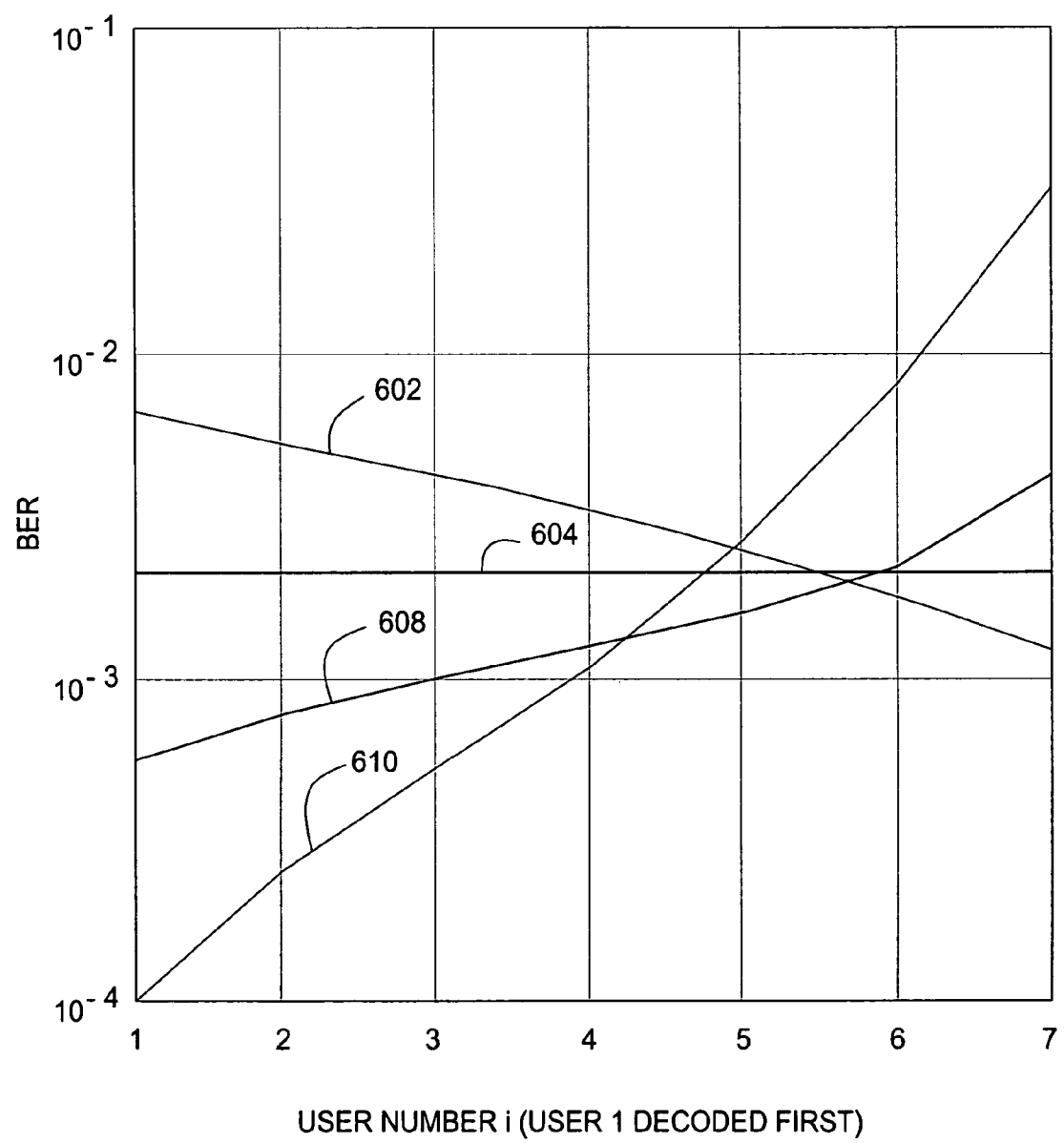
FIG. 6 shows a plot of the bit error rate (BER) versus the user number i.

FIG. 6 depicts a BER distribution for several schemes. In this figure, the variables have the following values: number of users K=7, the spreading gain N=32, the Nakagami fading parameter m=2, $S_T T/N_0$=10 db, and $\Omega_0$=1. Curve 608 corresponds to the minimal BER power adaptation technique; curve 604 corresponds to the equal BER power adaptation technique; curve 602 corresponds to the conventional adaptation; and curve 610 corresponds to no power adaptation. This shows that, with the minimal BER power-adaptation strategy, the BER of the earlier cancelled signal is lower than that of the later cancelled signal. That is, such a strategy makes the symbol decision at earlier cancellation stages more reliable than later cancellations, so the error propagation is protected and the resulting average BER can be minimized. In fact, with the minimal BER power-adaptation strategy, the average BER for each user is the same even though the instantaneous BER is different. Hence, it is an appropriate strategy for non-real-time applications, where the use of forward error correction with a large interleaving span having a large number of fades is allowed. On the other hand, the strategy of no power adaptation, which has natural disparities between received power levels, results in a relatively high BER at later cancellation stages, thereby dominantly degrading the average BER. Finally, the conventional power-adaptation strategy, which maintains the received signal powers for all users at the same level, fails to yield a reliable symbol decision at earlier cancellations, leading to significant error propagation to later cancellation stages and hence results in the degradation of average BER.

Figure 7:
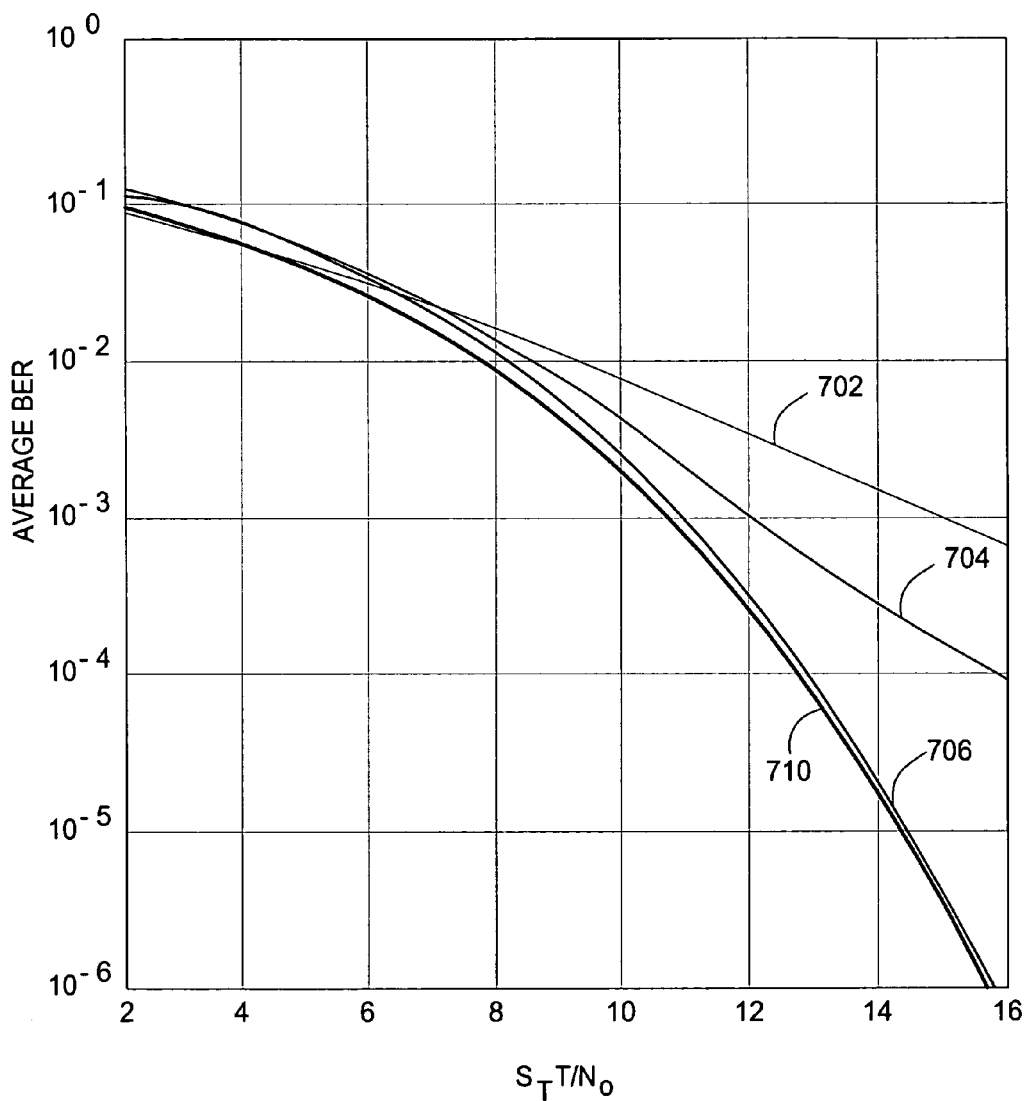
FIG. 7 shows a plot of the average bit error rate versus $S_T T/N_0$.

The average BERs for the different adaptation schemes are compared in FIG. 7. In this figure, the variables have the following values: number of users K=7, the spreading gain N=32, the Nakagami fading parameter m=2, $S_T T/N_0$=10 dB, and $\Omega_0$=1. Curve 710 corresponds to the minimal BER power adaptation technique; curve 706 corresponds to the equal BER power adaptation technique; curve 704 corresponds to the conventional adaptation; and curve 702 corresponds to the no power adaptation. It shows that the conventional power adaptation cannot yield significant performance improvements over the non-adaptive scheme, while the other two power-adaptation strategies (minimal BER and equal BER power adaptation) have significant power gains over the conventional-power or no power adaptation. This indicates that appropriate disparities in received power levels incurred by transmission power adaptation can be utilized effectively when using successive interference cancellation. The power gain, which translates into a power reduction at the transmitter, results in reduced interference to other users and leads to a capacity increase. It is noted that the equal BER power-adaptation strategy yields comparable performance to the minimal BER power adaptation and that the performance difference becomes negligibly small as $S_T T/N_0$ increases. This indicates that, at an interference-limited region (for higher $S_T T/N_0$), keeping an equal signal-to-interference-plus-noise ratio after successive interference cancellation for all received signals is the way to attain the minimum average BER.

Figure 8:
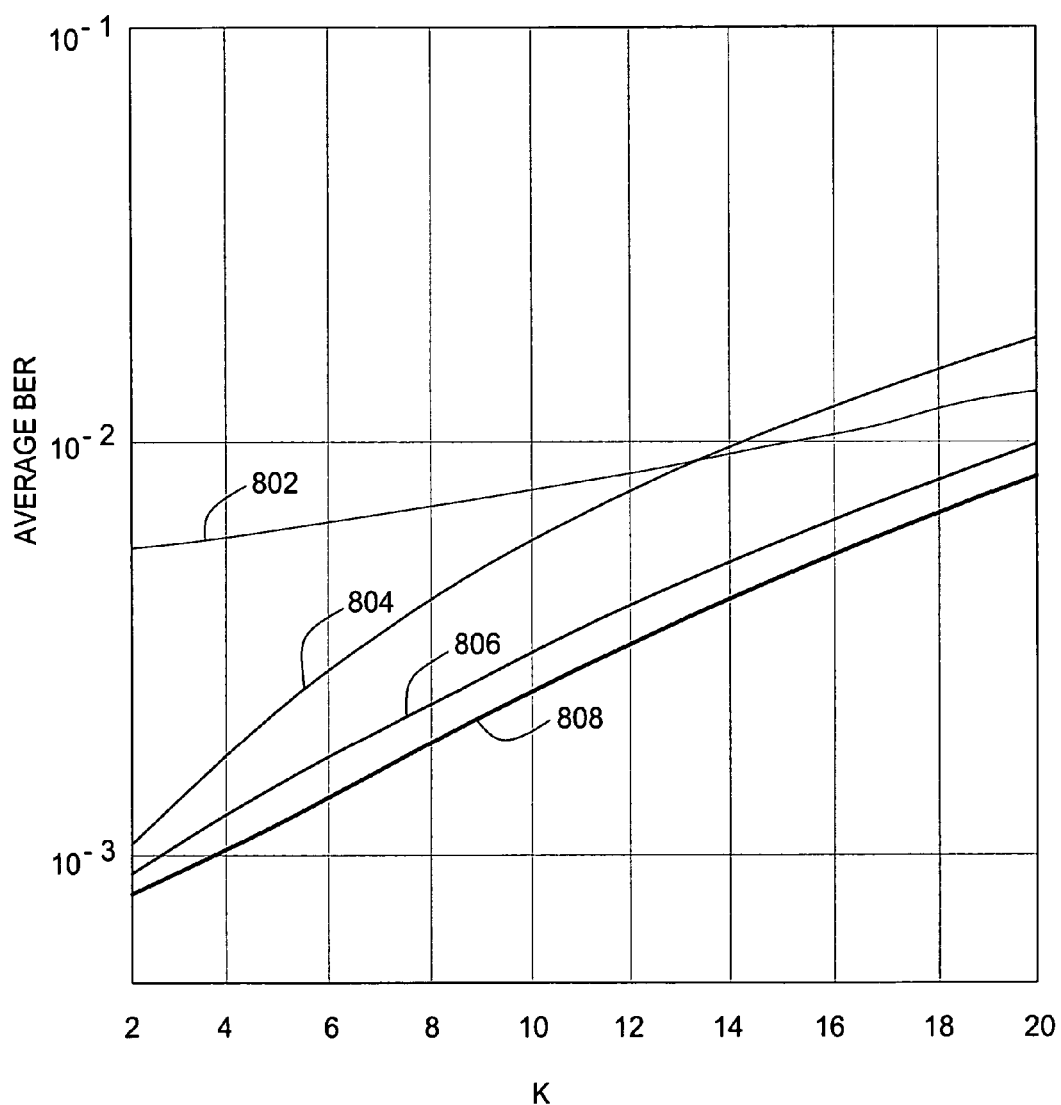
FIG. 8 shows a plot of the average bit error rate versus the number of users K.

FIG. 8 depicts the average BER versus the number of users. In this figure, the variables have the following values: number of users K is varied from 2 to 20, the spreading gain N=32, the Nakagami fading parameter m=2, $S_T T/N_0$=10 dB, and $\Omega_0$=1. Curve 808 corresponds to the minimal BER power adaptation technique; curve 806 corresponds to the equal BER power adaptation technique; curve 804 corresponds to the conventional adaptation; and curve 802 corresponds to the no power adaptation. At an average BER of $5 \times 10^{-3}$, the maximum number of users supportable with the equal BER power adaptation and the minimal BER power adaptation increase by factors of 14/9 and 16/9, respectively, over the conventional power adaptation. This capacity gain translates into a reduction of transmitter power required to support a target system loading, which, in turn, can translate into a prolongation of the battery life at a mobile handset.

Figure 9:
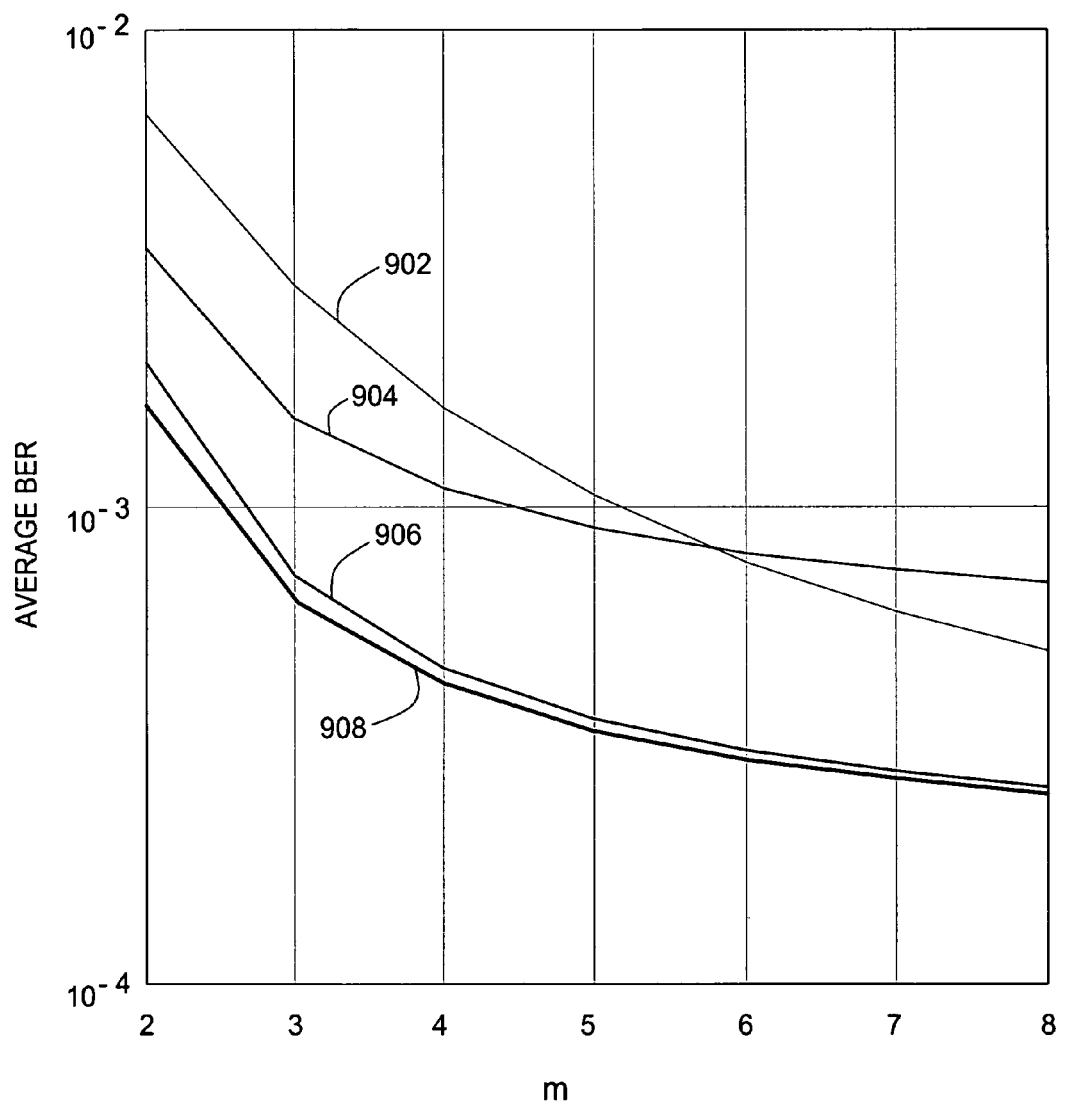
FIG. 9 shows a plot of the average bit error rate versus the Nakagami fading parameter m.

FIG. 9 depicts the average BER as a function of the Nakagami fading parameter. In this figure, the variables have the following values: number of users K=7, the spreading gain N=32, the Nakagami fading parameter is varied from m=2 to m=8, $S_T T/N_0$=10 dB, and $\Omega_0$=1. Curve 908 corresponds to the minimal BER power adaptation technique; curve 906 corresponds to the equal BER power adaptation technique; curve 904 corresponds to the conventional adaptation; and curve 902 corresponds to the no power adaptation. This figure shows that, for higher m with a stronger line-of-sight component, the performance difference between the minimal BER and the equal BER power adaptation becomes negligible. It also is interesting to note that, for some range of system parameters, the no-power-adaptation strategy exhibits better BER performance than the conventional power adaptation. With a weaker line-of-sight components (i.e., for smaller m), transmitted signals undergo relatively severe channel fading, which results in higher disparity between received power levels, leading to much weaker signal powers for later cancellation stages; hence, later cancelled signals dominantly degrade the average BER. On the other hand, as the line-of-sight component increases, the signal fluctuation over the fading channel is reduced and the natural disparities incurred by a no power-adaptation scheme can be exploited more effectively in successive interference cancellation, yielding better performance than the conventional power-adaptation scheme. In the limiting case where m approaches infinity (i.e., no fading), the no-power-adaptation scheme has exactly the same received power distribution as the conventional power-adaptation strategy, since the channel gains for all users go asymptotically to zero.

Power adaptation has been described for successive interference cancellation in DS/CDMA systems, where transmission power is adjusted to create appropriate disparities in the received signal powers. Two adaptation strategies have been set forth. With the first strategy, transmission power for each user is adapted such that the average BER is minimized; while with the other strategy, equal BER is obtained for each user after successive interference cancellation for all received signals. The two adaptation strategies have been shown to have significant power gains over the conventional power adaptation. It has also been found that the performance difference between the two strategies becomes negligible as either $S_T T/N_0$ or the Nakagami fading parameter m increases indicative of improved channel (link) conditions. The power gain provided by controlling disparities between received powers translates into a capacity increase and a prolonged battery life at the transmitter.

While the foregoing is directed to embodiments of the present invention, other and further embodiments of the invention may be devised without departing from the basic scope thereof, and the scope thereof is determined by the claims that follow.

The invention claimed is:

1. A method for transmit power adaptation in a CDMA wireless communication system receiving mobile station signals, said system including a plurality of K mobile stations communicating with at least one base station having a successive interference cancellation receiver, the method comprising:

estimating channel gain for each mobile station, to thereby form a corresponding estimated channel gain, in response to received mobile station signals;

ordering received signals from the mobile stations on a basis of the corresponding estimated channel gain from the mobile station associated with a highest channel gain $G_{(1)}$ to the mobile station associated with a lowest channel gain $G_{(K)}$;

determining a transmit power $S_{(i)}$ for each mobile station in response to the ordered channel gains by iteratively calculating:

$$S_R^{(i)} = x_i S_R^{(1)} \text{ and } S_{(i)} = S_R^{(i)}/G_{(i)},$$

for $x_1$=1 and i=2, 3, . . ., K, wherein $S_R^{(i)}$ is the received signal power from the mobile station associated with the $i^{th}$ highest channel gain $G_{(i)}$ and $x_i$ is a positive number, said determining comprising computing each $x_i$ to minimize an average bit error rate $\overline{P}_b$ for signals from each mobile station as:

$$\underset{x_2, x_3, \ldots x_K}{\text{minimize}} \overline{P}_b = \frac{1}{K} \sum_{i=1}^{K} Q\sqrt{\Lambda_i},$$

where $x_1$=1 and $\overline{P}_b$ is an average probability of a bit error and $\Lambda_i$ is a signal-to-interference-plus-noise ratio associated with the $i^{th}$ strongest user, said minimizing comprising obtaining partial derivatives of $\overline{P}_b$ with respect to each of the $x_i$, i=2, . . ., K, setting the partial derivatives equal to zero, and solving the resulting set of simultaneous equations; and transmitting to each mobile station the determined transmit power associated with that mobile station.

2. The method as defined in claim 1, further comprising adjusting the transmit power at a mobile station to the transmit power for that mobile station from the determining step.

3. The method as defined in claim 1, wherein said transmitting further comprises associating the transmit power $S_{(i)}$ from said determining with a particular mobile station.

4. The method as defined in claim 3, wherein said associating includes mapping an ordering index (i) with a mobile station identifier j, where j=1, 2, . . . , K, and j identifies that mobile station having the $i^{th}$ highest channel gain according to the ordering index (i).

5. The method as defined in claim 1, further comprising recovering, via successive interference cancellation, each received mobile station signal in the order designated by the ordering of the estimated channel gains, from the highest channel gain to the lowest channel gain, and outputting each recovered mobile station signal in the same order.

6. The method as defined in claim 1, said solving comprising applying a multi-dimensional Newton method to the set of equations.

7. The method as defined in claim 1, said solving comprising applying a multi-dimensional Secant method to the set of equations.

* * * * *